United States Patent
Wang

(10) Patent No.: US 11,068,369 B2
(45) Date of Patent: Jul. 20, 2021

(54) COMPUTER DEVICE AND TESTING METHOD FOR BASIC INPUT/OUTPUT SYSTEM

(71) Applicants: Inventec (Pudong) Technology Corporation, Shanghai (CN); INVENTEC CORPORATION, Taipei (TW)

(72) Inventor: Tzu-Pin Wang, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 132 days.

(21) Appl. No.: 16/439,720

(22) Filed: Jun. 13, 2019

(65) Prior Publication Data

US 2020/0379859 A1 Dec. 3, 2020

(30) Foreign Application Priority Data

May 29, 2019 (CN) .......................... 201910455037.6

(51) Int. Cl.
*G06F 11/00* (2006.01)
*G06F 11/22* (2006.01)
*G06F 11/25* (2006.01)
*G06F 9/4401* (2018.01)
*G06F 11/267* (2006.01)

(52) U.S. Cl.
CPC ........ *G06F 11/2273* (2013.01); *G06F 9/4401* (2013.01); *G06F 11/25* (2013.01); *G06F 11/267* (2013.01); *G06F 11/2284* (2013.01)

(58) Field of Classification Search
CPC .... G06F 11/2273; G06F 11/25; G06F 11/267; G06F 11/2284; G06F 11/1417; G06F 11/2278; G06F 9/4401
See application file for complete search history.

(56) References Cited

U.S. PATENT DOCUMENTS

| | | | | |
|---|---|---|---|---|
| 5,793,943 A | * | 8/1998 | Noll ..................... | G06F 11/1417 714/11 |
| 2002/0099974 A1 | * | 7/2002 | Lin ..................... | G06F 11/1417 714/13 |
| 2005/0081090 A1 | * | 4/2005 | Lin ..................... | G06F 11/1417 714/6.11 |
| 2009/0063834 A1 | * | 3/2009 | Huang ................. | G06F 9/4401 713/2 |
| 2010/0100720 A1 | * | 4/2010 | Wu ..................... | G06F 11/1417 713/2 |

* cited by examiner

*Primary Examiner* — Joseph D Manoskey
(74) *Attorney, Agent, or Firm* — CKC & Partners Co., LLC

(57) ABSTRACT

A test method for a basic input/output system (BIOS), configured to test a computer device which includes the BIOS when a power on self test (POST) of the BIOS fails, is disclosed including following operations: enabling a fixing function of the BIOS by a debug port of a motherboard of the computer device; enabling a first memory device and disabling a second memory device, by the debug port; according to the fixing function, turning on the computer device by the first memory device; and determining whether the computer device is turned on successfully.

10 Claims, 3 Drawing Sheets

COMPUTER DEVICE AND TESTING METHOD FOR BASIC INPUT/OUTPUT SYSTEM

PRIORITY CLAIM AND CROSS-REFERENCE

The present application claims priority to China application No. 201910455037.6, filed May 29, 2019, which is herein incorporated by reference.

BACKGROUND

A basic input/output system (BIOS) is used for an interface of communication between the computer hardware and operating system. Especially, when the computer is turning on, the BIOS is further configured to correctly initial the hardware in the computer, so that the hardware is able to be operated normally after the operating system is operated.

When an abnormal hardware exists in the computer system with the result that the computer is unable to be turned on normally, the BIOS generates warning sound to inform the user. The computer tester then uses a special debug BIOS to test the computer in order to find the issue. There are a lot of labor costs for switching the hardware.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
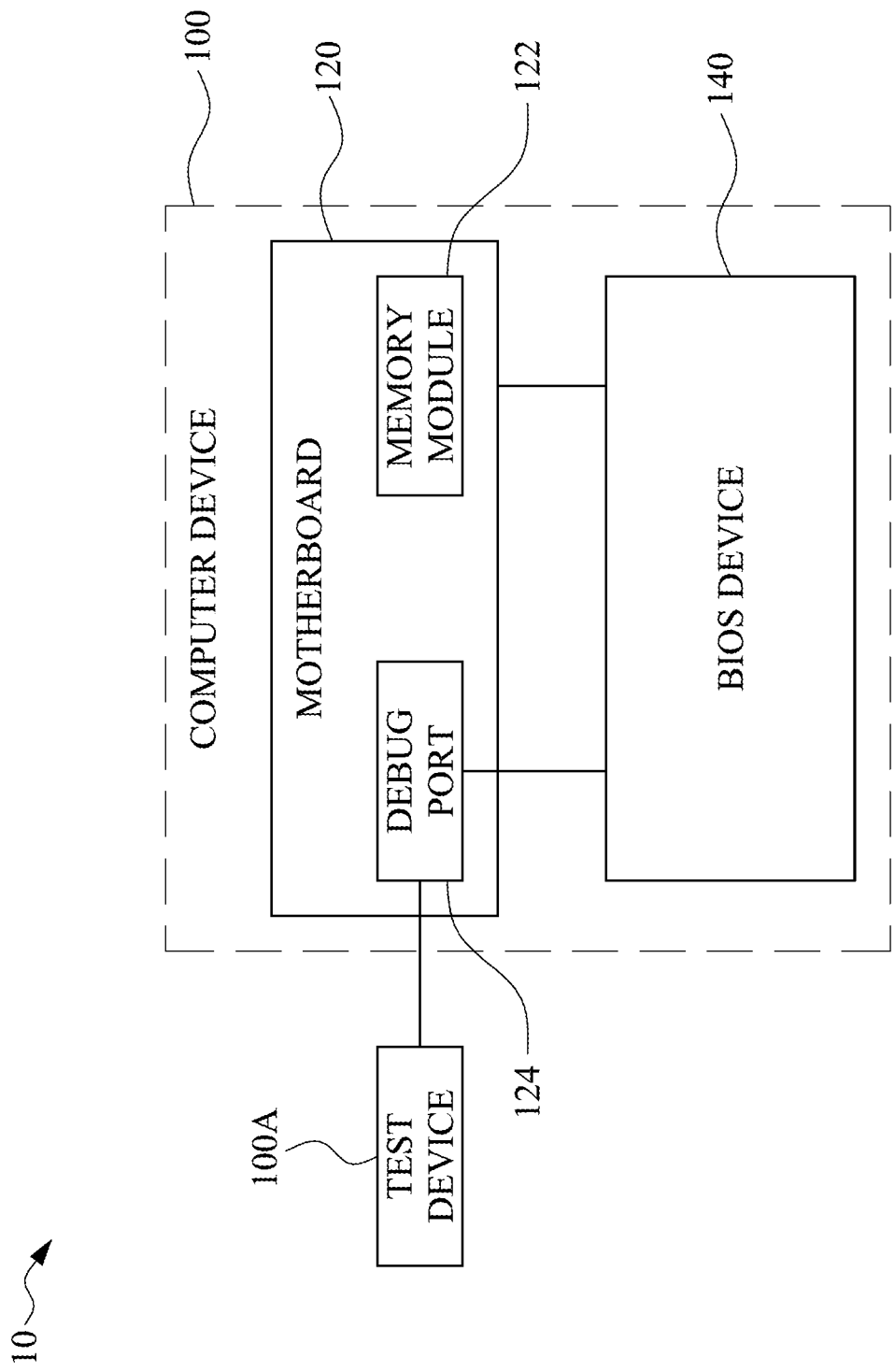
FIG. 1 is a schematic diagram of a computer system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Reference is now made to FIG. 1. FIG. 1 is a schematic diagram of a computer system 10, according to some embodiments of the present disclosure. In some embodiments, the computer system 10 is configured to perform a test method 300 illustrated in FIG. 3, and the test method 300 will be discussed later with respect to FIG. 3.

For illustration in FIG. 1, the computer system 10 includes a computer device 100 and a test device 100A. The test device 100A is coupled to the computer device 100. In some embodiments, the computer device 100 includes a motherboard 120 and a basic input/output system (BIOS) device 140. The BIOS device 140 is coupled to the motherboard 120. In some embodiments, the motherboard 120 includes a memory module 122 and a debug port 124.

In some embodiments, the test device 100A is coupled to the motherboard 120 in the computer device 110. In some embodiments, the test device 100A is coupled to the debug port 120 in the motherboard 120. In some embodiments, the BIOS device 140 is coupled to the memory module 122 and the debug port 124 in the motherboard 120, respectively.

In some embodiments, the computer device 100 is a personal computer (PC). Under a normal condition, the computer device 100 enables the motherboard 120 by the BIOS device 140. If there is an abnormal component existing in the motherboard 120 (for example, an abnormal memory module 122), the computer device 100 is unable to be turn on normally. In some embodiments, the motherboard 120 has defect (for example, a broken capacity), the defect causes that the computer device 100 fails on turning on. In some other embodiments, an element is not installed properly on the motherboard 120, the said element causes that the computer device 100 fails on turning on.

In some embodiments, if the computer device 100 fails on turning on, the test device 100A coupled to the computer device 100 is configured to turn on the computer device 100. Alternatively stated, when the computer device 100 is operated normally, the test device 100A is not needed for turning on the computer device 100.

In some embodiments, the test device 100A tests the computer device 100 via the debug port 124. The test device 100A is a signal generator which includes jumper and solder.

In some embodiments, the motherboard 120 further includes multiple sockets configured to install the central processing unit (CPU), the graphics card, the hard disc drive, etc. (not shown). In some embodiments, the motherboard 120 is made up of circuits and is connected to the elements thereon by the circuits.

In some embodiments, the memory module 122 is configured to store the programming codes for turning on the computer device 100. The memory module 122 is a hardware component directly mounted on the motherboard 120, i.e., on board memory. The memory module 122 is directly welded on the motherboard 120 and is hard to be switched manually. If the memory module 122 on the motherboard 120 is needed to be repaired, it costs a lot of labor and time on desoldering the memory module 122 mounted on the motherboard 120 and soldering a new memory back to the motherboard 120. In some other embodiments, the memory module 122 includes double channels. Each channel supports two dual in-line memory modules (DIMM). Alternatively stated, the memory module 122 supports four DIMMs. In some embodiments, each DIMM is configured to install memory chips. In some embodiments, the memory chips are dynamic random access memory (DRAM) chips, for example, double data rate synchronous dynamic random access memory (DDR SDRAM) chips. In some other embodiments, the memory chips in memory module 122 are also referred to as on board DDR. The memory module 122 mentioned above is provided for illustrative purposes. Various memory modules 122 are within the contemplated scope of the present disclosure. For example, the memory module 122 includes three or more channels.

In some embodiment, the debug port 124 is input/output port (I/O port) and configured to debug the possible error occurred in the motherboard 120. The debug port 124 includes I/O pins. In some embodiments, the debug port 124 is general purpose input output (GPIO) port, and the debug port 124 includes GPIO pins configured to receive and/or output signals, for example, receiving a clock signal. In some embodiments, the user can use present or customized programs to control the motherboard 120 by the GPIO pins.

In some embodiments, the BIOS device 140 is configured as a firmware interface. When the computer device 100 is turning on, the BIOS device 140 is configured to perform a power on self test (POST). When the BIOS device 140 performed the POST, the BIOS device 140 tests the components on the computer device 100, in order to make sure every component works normally. In some other embodiments, when there is an abnormal component exists on the computer device 100, the BIOS device 140 is configured to generate a warning signal, for example, a warning sound. In other words, when the computer device 100 cannot be turning on normally, the BIOS device 140 generates warning signal to notice the user.

In some embodiments, the BIOS device 140 is further configured to load the operating system (OS) or the initial program loader (IPL) stored in the motherboard 120 after the computer device 100 is turned on successfully.

Figure 2:
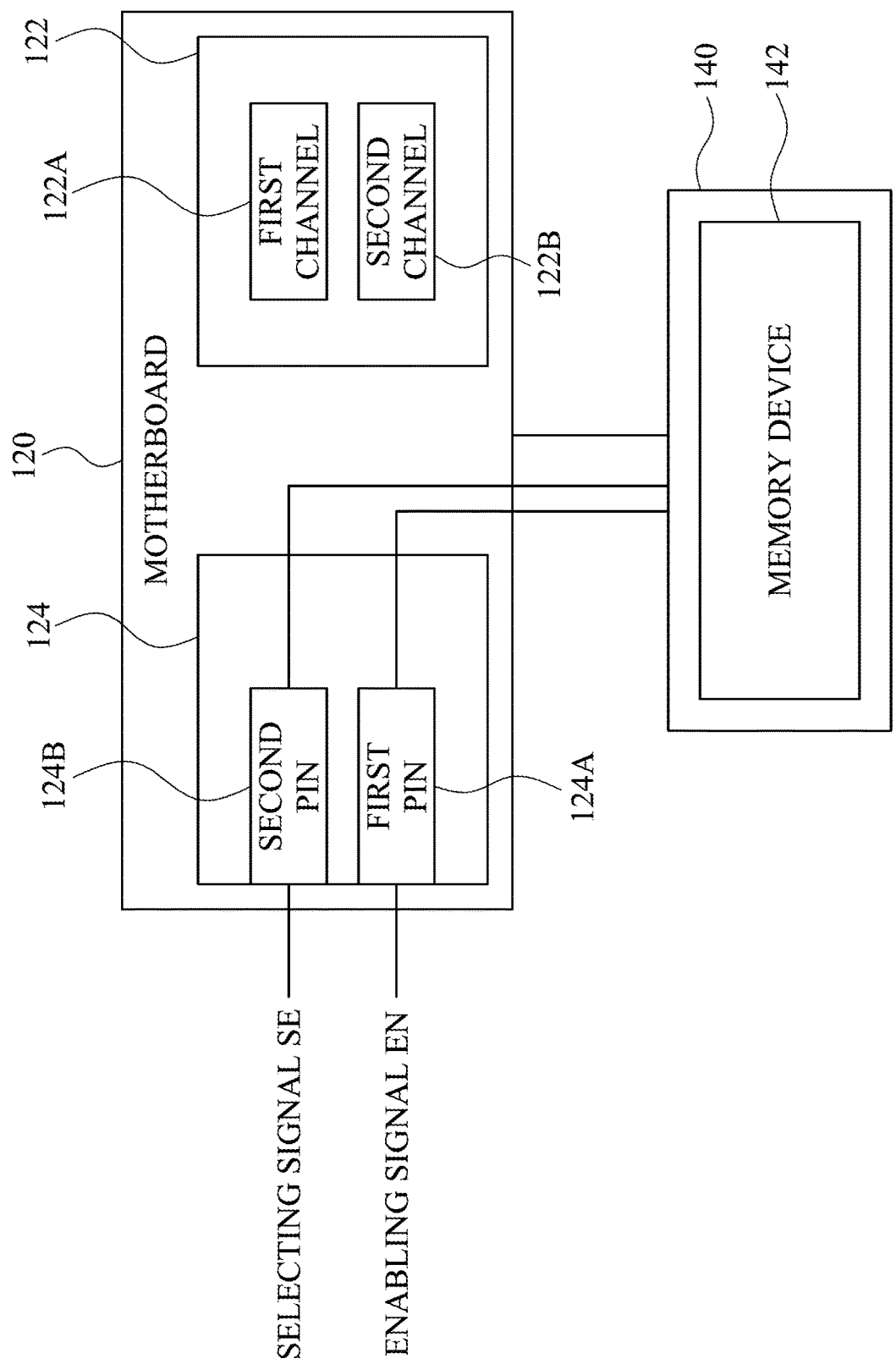
FIG. 2 is a schematic diagram of part of the computer system shown in FIG. 1, in accordance with some embodiments.

Reference is made to FIG. 2. FIG. 2 is a schematic diagram of part of the computer system 100 shown in FIG. 1, according to some embodiments of the present disclosure. For ease of understanding, like elements in FIG. 2 are designated with the same reference numbers with respect to FIG. 1.

For illustration in FIG. 2, the memory module 12 includes a first channel 122A and a second channel 122B. In some embodiments, the first channel 122A and the second channel 122B are configured for installing memory chip, respectively. In some other embodiments, if there is at least one abnormal memory chip exists in the aforementioned memory chips, the computer device 100 is not able to be tuned on successfully.

For illustration in FIG. 2, the debug port 124 includes a first pin 124A and a second pin 124B. In some embodiments, the first pin 124A is configured to receive an enabling signal EN, and the second pin 124B is configured to receive a selecting signal SE. The enabling signal EN is configured to enable a fixing function of the BIOS device 140. The selecting signal SE is configured to enable the first channel 122A of the memory module 122 and disable the second channel 122B of the memory module 122 via the BIOS device 140, or configured to enable the second channel 122B of the memory module 122 and disable the first channel 122A of the memory module 122 via the BIOS device 140. In some embodiments, the enabling signal EN and the selecting signal SE are digital signals. In some embodiments, the enabling signal EN and the selecting signal SE are provided by the test device 100A shown in FIG. 1.

In some embodiments, when the first pin 124A receives the enabling signal EN which has a logic high level, the fixing function of the BIOS device 140 is disabled. In contrast, when the first pin 124A receives the enabling signal EN which has a logic low level, the fixing function of the BIOS device 140 is enabled. In some other embodiments, when the first pin 124A is coupled to the ground, the fixing function of the BIOS device 140 is thus enabled.

In some embodiments, when the second pin 124B receives the selecting signal SE which has the logic high level, the memory chips installed in the first channel 122A are enabled, and the memory chips installed in the second channel 122B are disabled. In contrast, when the second pin 124B receives the selecting signal SE which has the logic low level, the memory chips installed in the second channel 122B are enabled, and the memory chips installed in the first channel 122A are disabled.

For illustration in FIG. 2, the BIOS device 140 includes memory device 142. In some embodiments, the memory device 142 is implemented by electrically-erasable programmable read-only memory (EEPROM). In some other embodiments, the memory device 142 is implemented by flash memory. In some embodiments, the memory device 142 is configured to store the programming code of the said fixing function. In some other embodiments, the memory device 142 is further configured to store other programming code.

In some embodiments, the debug port 124 is configured to transmit the enabling signal EN received at the first pin 124A to the memory device 142 in order to enable the fixing function stored in the memory device 142. The debug port 124 is further configured to transmit the selecting signal SE received at the second pin 124B to enable the memory chips on the first channel 122A and disable the memory chips on the second channel 122B via the BIOS device 140. Therefore, the fixing function stored in the memory device 142 is able to turn the computer device 100 on by using the memory chips on the first channel 122A independently. If it fails to turn the computer device 100 on by using the memory chips on the first channel 122A independently, it is determined that there is an abnormal memory chip existing in the memory chips on the first channel 122A.

In some other embodiments, according to the description in the previous paragraph, the fixing function stored in the memory device 142 is also able to turn the computer device 100 on by using the memory chips on the second channel 122B independently. If it fails to turn the computer device 100 on by using the memory chips on the second channel 122B independently, it is determined that there is an abnormal memory chip existing in the memory chips on the second channel 122B.

The configurations of computer system 10 shown in FIG. 1 and FIG. 2 are provided for illustrative purposes. Various configurations of the computer system 10 are within the contemplated scope of the present disclosure.

Figure 3:
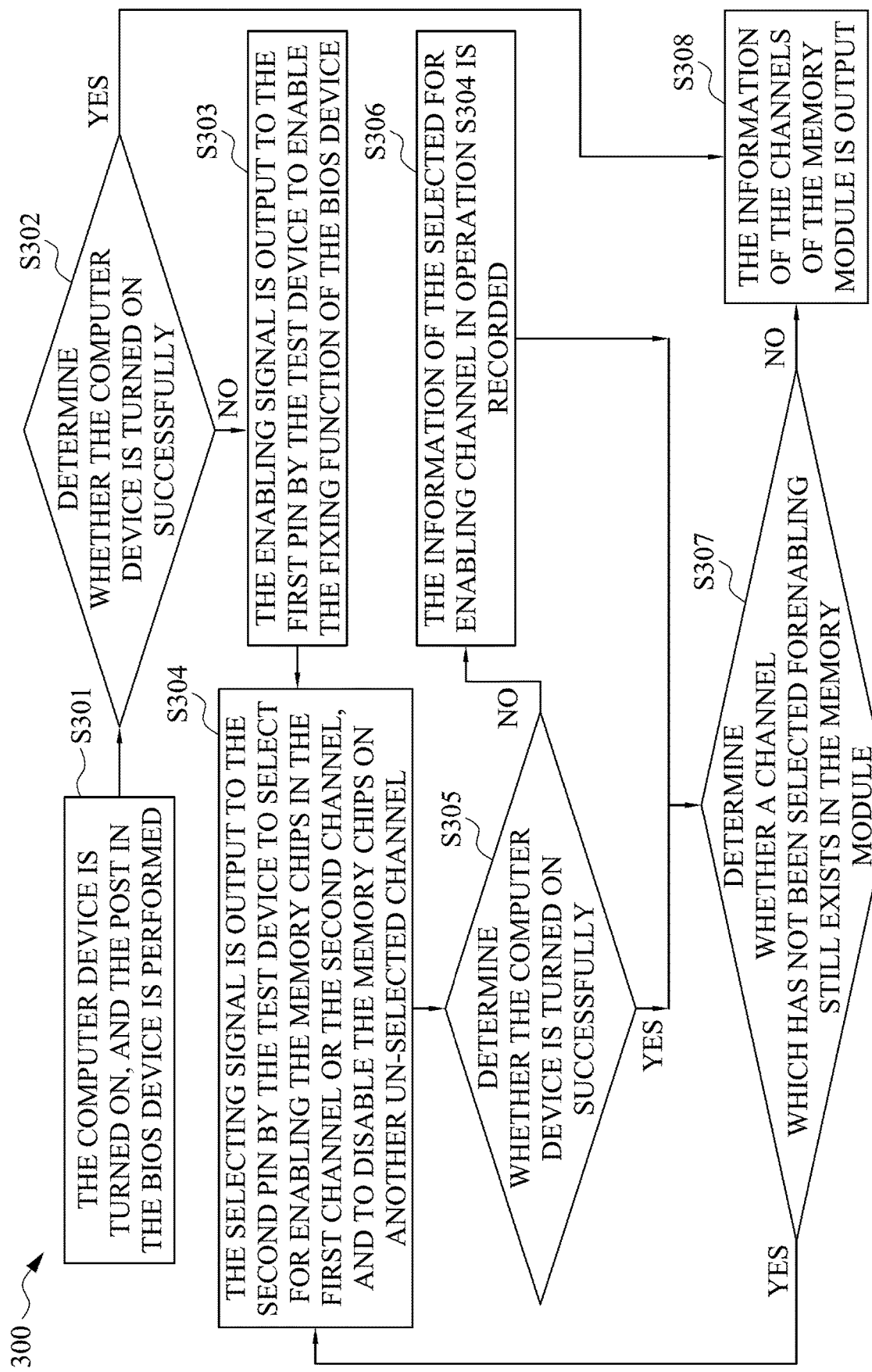
FIG. 3 is a flow chart of test method for the computer system shown in FIG. 1 and FIG. 2, in accordance with some embodiments.

Reference is made to FIG. 3. FIG. 3 is a flow chart of test method 300 for the computer system 10 shown in FIG. 1 and FIG. 2, according to some embodiments of the present disclosure. For illustration in FIG. 3, the test method 300 includes operation S301, S302, S303, S304, S305, S306, S307, and S308. In some embodiments, the test method 300 is applied in the embodiments of the FIG. 1 and FIG. 2, for example, the test method 300 is configured to test whether an abnormal component exists in the on board memory module 122 in the motherboard 120 by turning on the computer device 100. Since the on board memory module 122 is hard to be switched manually, the test method 300 is configured to test the on board memory module 122 without switching the memory module 122. For ease of understanding, the test method 300 is discussed with respect to FIG. 1 and FIG. 2, but the present disclosure is not limited thereto.

In operation S301, the computer device 100 is turned on, and the POST in the BIOS device 140 is performed.

In operation S302, the operation S302 is performed to determine whether the computer device 100 is turned on successfully. In some embodiments, if the computer device 100 fails to be turned on, the BIOS device 140 generates the warning signal when the POST in the BIOS device 140 is performed. In some embodiments, if the computer device 100 operates the operating system successfully, it is determined that the computer device 100 is turned on successfully.

When the computer device 100 fails to be turned on, then the operation S303 is performed. When the computer device 100 is turned on successfully, as depicted in FIG. 3, the operation S308 is performed. In operation S303, the enabling signal EN is output to the first pin 124A of the debug port 124 of the motherboard 120 by the test device 100A to enable the fixing function of the BIOS device 140.

In operation S304, the selecting signal SE is output to the second pin 124B of the debug port 124 by the test device 100A to select for enabling the memory chips in the first channel 122A or the second channel 122B in the memory module 122, and to disable the memory chips on another un-selected channel.

In operation S305, the operation S305 is performed to determine whether the computer device 100 is turned on successfully by using the fixing function of the BIOS device 140 to turn on the computer device 100.

For illustration in FIG. 3, when the computer device 100 fails to be turned on, the operation S306 is performed. In contrast, when the computer device 100 is turned on successfully, the operation S307 is performed. In operation S306, the information of the selected for enabling channel in operation S304 is recorded. In some embodiments, the selected for enabling channel in operation S304 is recorded as "awaiting maintenance," and the tester can fix, according to the record, the memory chips on the channel recorded as "awaiting maintenance" after the test method 300 is done.

In operation S307, the operation S307 is performed to determine whether a channel which has not been selected for enabling still exists in the memory module 122. If there is a channel which has not been selected for enabling existing in the memory module 122, the operation S304 is performed to select for enabling the un-selected channel. If there is no channel which has not been selected for enabling existing in the memory module 122, the operation S308 is performed. In other words, if all channels in the memory module 122 have been selected for enabling, the operation S308 is performed.

In operation S308, the information of the channels of the memory module 122 is output. In some embodiments, the said information includes the states of the first channel 122A and the second channel 122B, for example, the second channel 122B is recorded as "awaiting maintenance."

In some approaches, when the tester tests a computer which is not able to be turned on, the tester switches the original BIOS in the computer with a special BIOS in which the special BIOS is configured for testing the computer, and tests the computer by the function in the special BIOS. After the test is done, the tester switches the original BIOS back to the computer. It costs time and labor of switching hardware to test the computer.

Compared to the above approaches, when the computer device 100 is not able to be turned on normally, the computer device 100 is able to be tested via the debug port 124 of the motherboard 120 without switching the BIOS device 140, according to the present disclosure. Therefore, the labor and time cost is reduced, and the efficiency of the test method 300 is improved. In addition, the fixing function built in the BIOS device 140 is able to test each channel of the memory module 122 independently. Thus, when the test method 300 is operated, it narrows down the potential error taken place to a single channel, and further improves the efficiency of the test method 300 and reduces the time and labor cost by reducing the process of switching hardware, for example, the process of desoldering and soldering the memory module 122.

The above test method 300 includes exemplary operations, but the operations are not necessarily performed in the order shown. Operations of the test method 300 may be added, replaced, changed order, and/or eliminated as appropriate, in accordance with the spirit and scope of various embodiments of the present disclosure. For example, after the operation S308 is performed, the tester fixes the computer device 100 according to the record in the operation S306. For another example, the operation S306 is omitted.

A test method for a basic input/output system (BIOS), configured to test a computer device which includes the BIOS when a power on self test of the BIOS fails, is disclosed including following operations: enabling a fixing function of the BIOS by a debug port of a motherboard of the computer device; enabling a first memory device and disabling a second memory device, by the debug port; according to the fixing function, turning on the computer device by the first memory device; and determining whether the computer device is turned on successfully.

Also disclosed is a computer device includes a basic input/output system (BIOS) device and a motherboard. The BIOS device is configured to store a fixing function. The motherboard is coupled to the BIOS device, and the motherboard includes a first memory, a second memory, a first debug pin, and a second debug pin. The first debug pin is configured to receive an enabling signal to enable the fixing function. When the second debug pin has a logic high level, the first memory is disabled. When the second debug pin has a logic low level, the second memory is disabled.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A test method for a basic input/output system (BIOS), configured to test a computer device which includes the BIOS when a power on self test (POST) of the BIOS fails, comprising:
   when the BIOS fails to perform the POST after the BIOS is activated, by a debug port of a motherboard of the computer device, enabling the BIOS, and by the BIOS, performing a fixing function related to fixing a memory;
   by the debug port, enabling the BIOS, and by the BIOS, enabling a first memory device and disabling a second memory device;
   according to the fixing function, turning on the computer device by the first memory device; and
   determining whether the computer device is turned on successfully.

2. The test method of claim 1, further comprising:
by the debug port, enabling the second memory device and disabling the first memory device; and
according to the fixing function, turning on the computer device by the second memory device.

3. The test method of claim 1, wherein enabling the fixing function of the BIOS comprises inputting an enabling signal to a first pin of the debug port.

4. The test method of claim 3, wherein enabling the first memory device and disabling the second memory device comprises receiving the enabling signal having a logic high level by a second pin of the debug port.

5. The test method of claim 1, wherein enabling the fixing function of the BIOS comprises grounding a first pin of the debug port.

6. The test method of claim 1, wherein the first memory device and the second memory device are mounted on a first channel and a second channel of a memory module of a motherboard of the computer device, respectively.

7. The test method of claim 1, wherein when the computer device is determined as failing to turn on, switching the first memory device.

8. The test method of claim 1, wherein a programming code of the fixing function is stored in a read only memory (ROM) of the BIOS.

9. A computer device, comprising:
a basic input/output system (BIOS) device configured to store a fixing function; and
a motherboard coupled to the BIOS device, wherein the motherboard comprises a first memory, a second memory, a first debug pin, and a second debug pin,
wherein, when the BIOS device is activated, the first debug pin is configured to receive an enabling signal to enable the BIOS device, and the BIOS device performs the fixing function related to fixing a memory,
when the second debug pin has a logic high level, the first memory is disabled, and
when the second debug pin has a logic low level, the second memory is disabled.

10. The computer device of claim 9, wherein the first debug pin and the second debug pin are general purposes input/output (GPIO) pins.

\* \* \* \* \*